(No Model.)

W. W. D. JEFFERS.
MACHINE FOR BARKING WOOD.

No. 510,795. Patented Dec. 12, 1893.

Witnesses:
K. I. Clemons
J. N. Garfield

Inventor,
W. W. D. Jeffers,
by Chapin & Co. Attys.

UNITED STATES PATENT OFFICE.

WILLIAM W. D. JEFFERS, OF TICONDEROGA, NEW YORK, ASSIGNOR TO THE HOLYOKE MACHINE COMPANY, OF HOLYOKE AND WORCESTER, MASSACHUSETTS.

MACHINE FOR BARKING WOOD.

SPECIFICATION forming part of Letters Patent No. 510,795, dated December 12, 1893.

Application filed September 19, 1893. Serial No. 485,779. (No model.)

*To all whom it may concern:*

Be it known that I, WILLIAM W. D. JEFFERS, a citizen of the United States, residing at Ticonderoga, in the county of Essex and State of New York, have invented new and useful Improvements in Machines for Barking Wood, of which the following is a specification.

This invention relates to improvements in that class of machines for barking wood, which embodies a hollow blower with an opening at the front side thereof, and a disk rotating within the blower, and movable in the plane of, and substantially closing, said opening, but provided with a series of throats with shaving or planing knives located therein, and a rest near the exposed part of the disk for the support of the section of log to be barked.

In the use of these machines the section of log which is of comparatively small or convenient length is laid on the rest and subjected to the bark-removing action of the knives, and turned, as the bark is removed, to present new portions to the knives; the bark chips or shavings pass through the throats or knife openings into the interior of the blower, it being understood that the rotary disk has thereon a series of wings or fan-blades for producing the blower action and effecting the expulsion of the chips or shavings at the mouth of the blower where they are to be properly disposed of.

These machines are extensively used in wood pulp mills where only the unbarked wood is to be digested, and where an entire freedom of chips, dust or shavings is very desirable;—and the object of this invention is to so improve the bark-removing machines of the class indicated as to insure the suction or passage to the interior of the blower of all particles of bark, wood or dirt which may not pass thereinto through the knife throats of the disk; and to this end the invention consists in the combination with the knife and throat-provided disk and blower, substantially as aforementioned, of a conduit of ample cross sectional size having a mouth or opening near the log-rest, or adjacent to where the bark is removed and which leads to communication with the blower chamber whereby all the extraneous particles which may not enter the blower chamber through the knife throats in the disk will be drawn through said conduit into the blower to be thence expelled with the bulk of the waste product at the delivery mouth of the blower.

The invention is illustrated in the accompanying drawings, in which—

Figure 1:
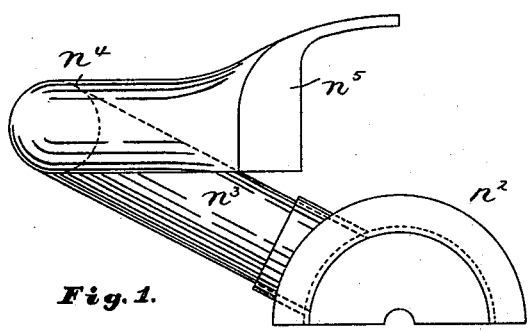
Figure 2:
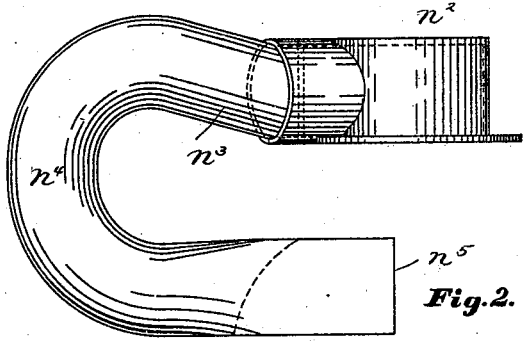
Figure 3:
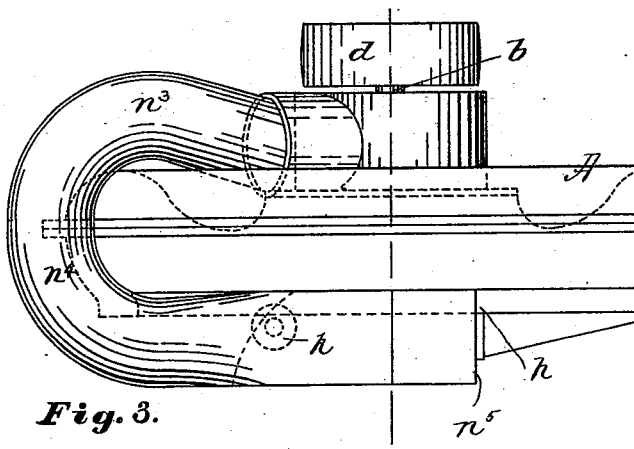

Figure 1 is a front side view of the suction conduit or attachment for the machine, while Fig. 2 is a plan view thereof. Fig. 3 is a plan view of the barking machine with the suction conduit applied thereupon, Fig. 4 being a front elevation of the machine and Fig. 5 a central vertical cross section, the plane of section being indicated by the line $x$—$x$, Fig. 4.

In the drawings, A represents the stationary shell or case of the blower which has the journal bearings, $a$, $a$, at front and rear, for the driving shaft, $b$, which is provided with the pulley, $d$. The shell of the blower is of an ordinary construction with the discharge mouth at $f$; and it has at its front upper side the opening, $g$, at which is the shelf or rest, $h$, for the section of log.

B represents a disk within, but next to the front wall of, the blower, it having a suitable hub, $i$, whereby it is keyed, or otherwise attached, to the driving shaft, $b$. This disk has a series of more or less radial throats, $j$, within which are set the planing or shaving knives, $m$, which successively, as the disk rotates, traverse the aforesaid opening, $g$, for the bark-removing action upon the log section which is supported on the shelf with its side pressed to the plane of movement of the knives. The ball, $k$, which is set for free rotation on a vertical axis stud and against which an end portion of the log above its center may rest, facilitates the turning of the log by hand to bring new portions of its side to the action of the knives. The disk has a series of fan wings or blades, $l$, for generating the suction or blowing action within the blower case.

Figure 5:
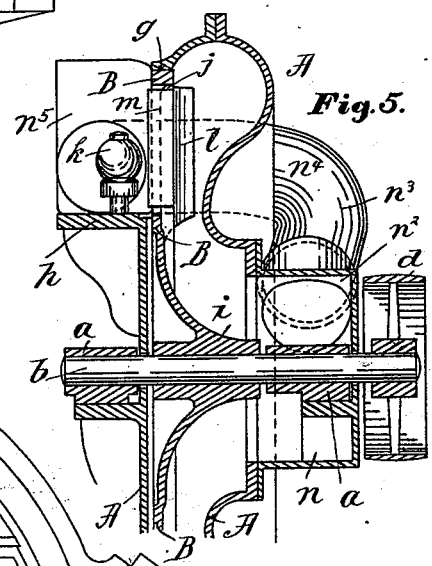
Figure 4:
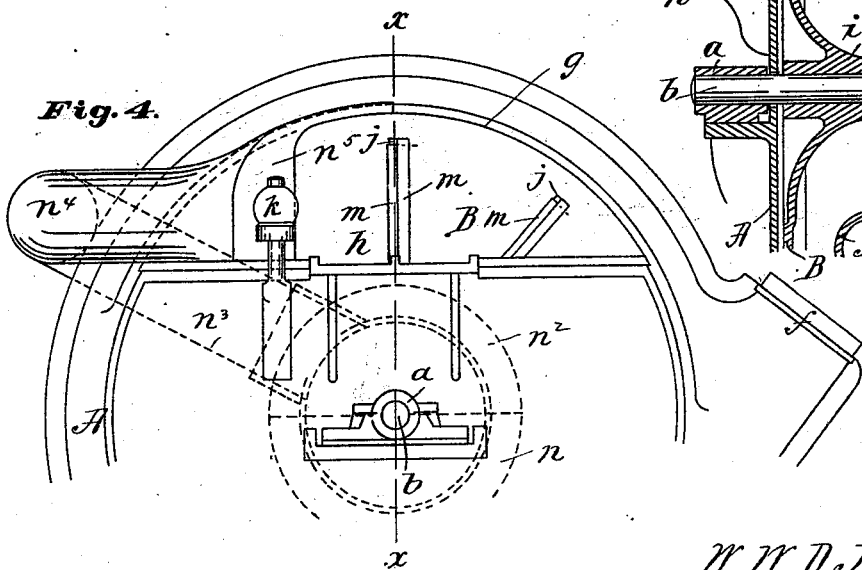

The machine thus briefly, but somewhat in detail, described, is one commonly and extensively employed for barking wood, but it will be furthermore seen that the hollow hub, $n$, which closes, or forms the closing part of, the blower shell, at the rear, comprises an upper removable hemi-cylindrical casing section $n^2$ with the radially upwardly inclined hollow extension or pipe, $n^3$, which is forwardly curved, as at $n^4$, whereby it is brought to the front of the blower shell, and terminates in the enlarged mouth, $n^5$, which is located next to and overhangs the rest for the log-sections, all as indicated especially in Figs. 4 and 5 of the drawings,—this entrance mouth of the conduit being of a form and range to most effectually take in, as insured by the suction action within the blower, all dirt, dust, or chips made at the rest, and which do not pass into the blower through the knife throats. The objectionable particles or matter thus drawn into the mouth, $n^5$, of this conduit pass thence through the latter into the blower chamber for expulsion at the discharge opening thereof, as plain. The attachment to the bark removing machine described while simple and inexpensive adds very materially to the efficiency and desirability of the machine.

Having thus described my invention, what I claim, and desire to secure by Letters Patent, is—

1. In a bark removing machine, the combination with a blower-casing having a discharge opening and an opening at its front, and a rotary disk with throats and knives movable across said front opening, and fan-blades or wings within the casing, of a conduit, having a mouth or ingress-opening adjacent the place of operation of said knives, and which leads to communication with the blower chamber, substantially as and for the purpose described.

2. In a bark removing machine, the combination with the blower-casing having the central driving shaft and the opening, $g$, at the front, and the rest, $h$, thereat, of the rotary disk carried by said shaft and movable in the plane of the said front opening, and having the throats and knives, and the fan-wings or blades, and the hollow hub or casing as a rearward extension of the blower shell, which comprises in part the removable hemi-cylindrical section, $n^2$, and the upwardly inclined pipe section, $n^3$, leading therefrom and extended around to the forward part of the blower-casing and terminating in the mouth or ingress-opening, $n^5$, adjacent said log rest and front opening, substantially as described.

WILLIAM W. D. JEFFERS.

Witnesses:
W. I. HIGGINS,
JOHN LAMBERT.